United States Patent [19]
Driker et al.

[11] Patent Number: 5,820,657
[45] Date of Patent: Oct. 13, 1998

[54] METHOD AND APPARATUS FOR PERCOLATING VACUUM CLEANING

[76] Inventors: Benjamin Driker, 40 Brighton 1 Rd. #7N, Brooklyn, N.Y. 11235; Mikhail Rukhlis, 315 Ocean Pkwy. #1F, Brooklyn, N.Y. 11218

[21] Appl. No.: 24,906

[22] Filed: Feb. 17, 1998

[51] Int. Cl.⁶ .................................................. B01D 47/02
[52] U.S. Cl. ................................ 95/216; 95/226; 95/218; 96/333; 96/335; 96/351; 96/360; 96/406
[58] Field of Search .............................. 96/279, 333, 342, 96/348, 351, 250, 335, 360, 362, 405, 406, 145, 146, 151; 95/216, 218, 226

[56] References Cited

U.S. PATENT DOCUMENTS

| | | | |
|---|---|---|---|
| 1,120,818 | 12/1914 | Johnson | 96/333 |
| 1,286,951 | 12/1918 | Davies | 96/342 |
| 1,466,500 | 8/1923 | Ford | 96/348 |
| 2,164,833 | 7/1939 | Norman | 96/342 |
| 2,247,103 | 6/1941 | Summerson | 96/342 |
| 3,498,029 | 3/1970 | Feuersanger | 96/362 |
| 4,055,405 | 10/1977 | Thun-Hohenstein | 96/406 |
| 4,251,485 | 2/1981 | Schauer et al. | 96/333 |
| 4,784,676 | 11/1988 | Hale | 96/342 |
| 4,851,016 | 7/1989 | Rylander | 96/348 |
| 5,192,344 | 3/1993 | House | 96/342 |
| 5,354,347 | 10/1994 | McCoy et al. | 96/342 |

FOREIGN PATENT DOCUMENTS 1006412  4/1952  France ..................................... 96/146

*Primary Examiner*—C. Scott Bushey

[57] ABSTRACT

Method and Apparatus for Percolating Vacuum Cleaning wherein driven by vacuum incoming to the apparatus mixture of air and other substances is directed under the top surface of a liquid, where heavier than air particles remain, but cleaned air particles percolate up to the sucking entrance of the vacuum initiator and then are exhausted from the apparatus.

4 Claims, 1 Drawing Sheet

METHOD AND APPARATUS FOR PERCOLATING VACUUM CLEANING

BACKGROUND OF THE INVENTION

This invention relates to the field of vacuum cleaning.

Prior art apparatuses for only dry vacuum cleaning and for wet-dry vacuum cleaning do not provide adequate dust removal from their exhausts, because there are many dust particles considerably smaller than pores in the filters; so, after vacuum cleaning of some premises, their volume of air, absorbing mentioned exhaust, contains more dust than it has contained before cleaning.

There are many wet-dry vacuum cleaning apparatuses in the prior art, which design requires interruption of operation when a dry cleaning is changing to a wet cleaning and vise-versa. This interruption is necessary for cleaning and drying the apparatus and changing or adding some filter or dust collecting bag (wet to dry change), or cleaning the apparatus and filter and removing previously added filter or dust collecting bag (dry to wet change).

SUMMARY OF THE INVENTION

First object of this invention is to provide substantial decrease of the dust in the exhaust of the vacuum cleaning apparatus.

Second object of this invention is to provide the possibility of uninterrupted wet to dry or dry to wet change of operations in the wet-dry vacuum cleaning apparatus.

Invention's method directs, driven by vacuum and incoming to the apparatus, mixture of air and other substances under the top surface of a liquid, where dust particles remain (becoming wet and much heavier), but cleaned from them air particles percolate up through the liquids to be finally exhausted from the apparatus.

Invention's apparatus implements its method, using a tube through which mentioned mixture of air and other substances is discharged under the top surface of said liquid.

Such provision makes exhaust much cleaner and allows uninterrupted wet to dry and dry to wet change of operations, because any incoming mixture wet or dry is immersed under the top surface of mention liquid in the apparatus.

THE DRAWING

FIG.1 represents a view of the apparatus with partial cuts off.

DESCRIPTION OF PREFERRED EMBODIMENT

Figure 1:
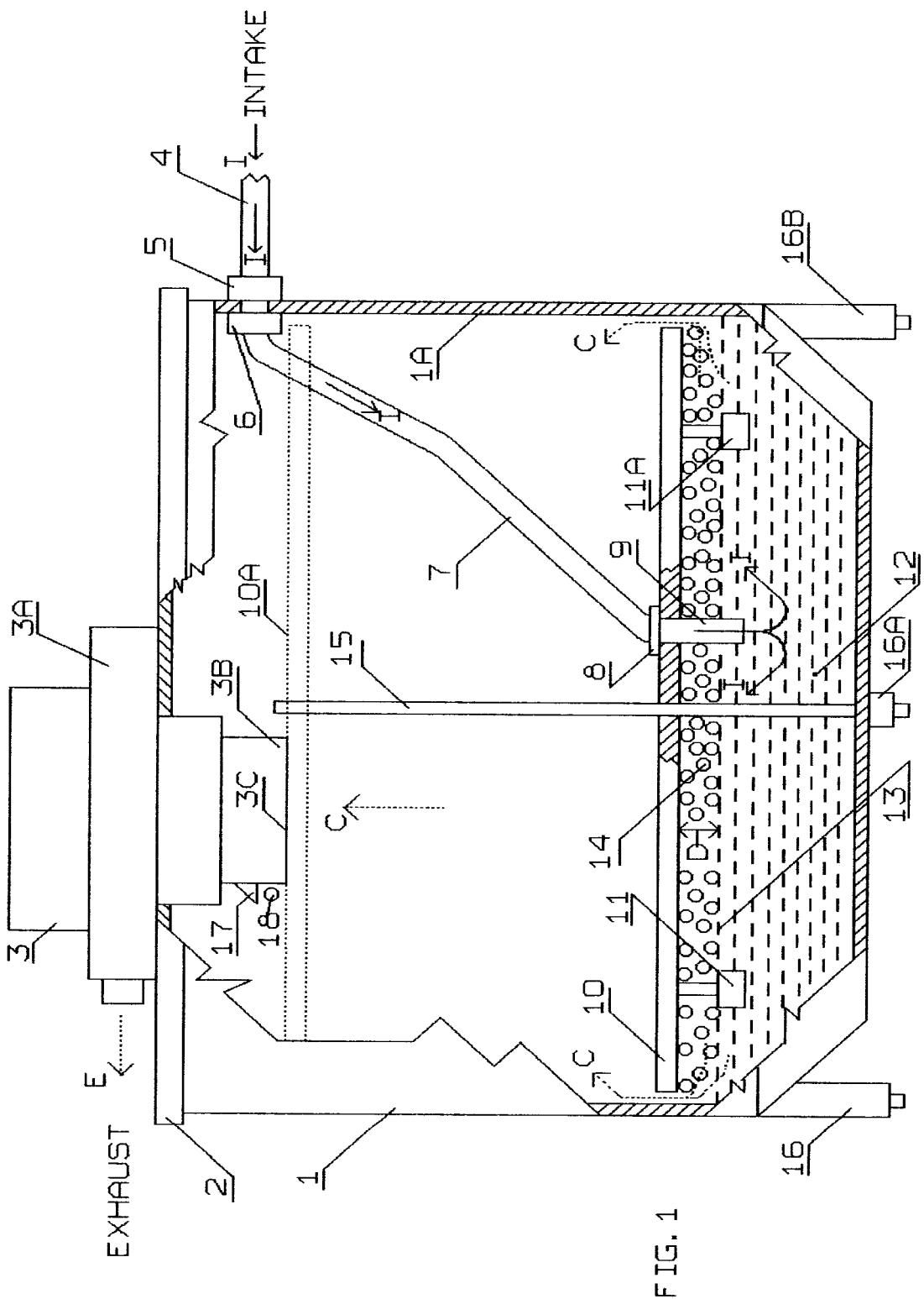

All references below are to FIG.1.

A container 1, with its cover 2, vacuum initiator 3 (with exhausting 3A and sucking 3B boxes) and wheel assemblies 16, 16A, 16B, contains some volume of liquid 12 with immersed in it floats 11 and 11a; the floats are supporting deflector 10 and keeping its bottom surface on a distance D from the top surface 13 of the liquid.

One of the directional rods 15 (others are not shown) assures only vertical movement of the deflector.

Intake I is driven by the vacuum into container and under the top surface 13 of liquid 12 through intake tube 4, flexible tube 7 and immersing tube 9. Connectors 5, 6 and 8 are assuring tightness and proper positioning of mentioned tubes.

Immersed in the liquid intake I disperses, and some parts of it percolate up over the top surface of a liquid into a region of percolation, designated by bubbles 14. Heavier then air percolating parts are deflected down by the bottom surface of the deflector 10, but cleaned particles of the air C continue to go up around deflector 10 and through the slots between it and the walls of the container 1A to the sucking box 3B, through it and exhausting box 3A to exhaust E, and out of the apparatus.

Sucking box 3B can contain some means of mist removal which may accompany being evacuated air; the outlet 17 and drop 18 designate liquid discharge caused by said mist removal.

When volume of taking in substance causes the top surface 13 of liquid 12 to reach its upper limit in the container, the top surface of the deflector 10A approaches and closes sucking entrance 3C of the sucking box 3B, stopping the process of vacuum making.

The walls of the lower part of the container are inclined to condition concentration of heavier parts of intake at the bottom of container.

Presented method and apparatus allow to obtain much cleaner exhaust from the vacuum cleaning operation and uninterrupted wet to dry and vise-versa change in vacuum cleaning.

It does not present an implementation challenge to contemporary technology and, being implemented, will be very helpful in keeping cleaner air and performing more convenient vacuuming of any kind of substances, eliminating the need of unpleasant interruption when substance changes.

We claim:

1. A method for percolating vacuum cleaning comprising:

providing a vacuum cleaning container including a bottom wall, a top wall, and sidewalls defining an interior chamber, the top wall supporting a vacuum initiator thereon, the vacuum initiator having an inlet, providing a volume of liquid within a bottom portion of the interior chamber, a top surface level of the liquid being substantially variable, providing a moveable deflector within the interior chamber, the deflector having float means attached to the underside thereof so as to maintain the underside of the deflector a predetermined distance above the top surface of the liquid, providing an intake into the vacuum cleaning container, the intake being rigidly connected within an aperture of one of the walls of the container, the aperture being above the top surface of the volume of liquid, rigidly connecting an immersion tube to and through the deflector, the immersion tube being of a length such that a lower, open end thereof is always below the surface of the volume of liquid, providing a length of flexible tubing connected between the intake and an upper end of the immersion tube, uninterrupted change from wet to dry or from dry to wet suctioning of a mixture of air and contaminants into the volume of liquid sequentially through the intake, the flexible tubing, and the immersion tube so as to input the mixture of air and contaminants beneath the surface of the volume of liquid, percolating the mixture through the liquid volume, the contaminants therein being deposited within the liquid volume, and the air cleansed by the liquid passing around the deflector and up to the vacuum initiator, and exhausting the clean air from the container through an outlet of the vacuum initiator.

2. The method of claim 1, further comprising:

collecting a sufficient amount of contaminants within the container to raise the surface of the liquid and thus the floating deflector such that the deflector closes the inlet to the vacuum initiator and stops the vacuuming process.

3. An apparatus for percolating vacuum cleaning comprising:

a container including a bottom wall, a top wall, and sidewalls to define an interior chamber, the top wall supporting a vacuum initiator thereon, the vacuum initiator having an inlet and an exhaust outlet for exhausting clean air from the container, a volume of liquid within a bottom portion of the interior chamber, a top surface level of the liquid being substantially variable, a moveable deflector within the interior chamber, float means on the underside of the deflector to maintain the underside of the deflector a predetermined distance above the top surface of the liquid, intake means for inputting a contaminated air mixture into the container, the intake means being rigidly connected to an aperture within a wall of the container, the aperture being above the surface of the liquid and the intake means being connected to an immersion tube via a flexible tube, the immersion tube being rigidly connected to and passing through the deflector, and the immersion tube having a length sufficient that contaminated air passing therethrough is injected beneath the surface of the liquid.

4. The apparatus of claim 3, further comprising:

a plurality of directional rods for insuring vertical movement of the deflector.

\* \* \* \* \*